United States Patent [19]

Takahashi et al.

[11] Patent Number: 5,467,475
[45] Date of Patent: Nov. 14, 1995

[54] DATA COLLECTION-TRANSMISSION APPARATUS AND DATA COLLECTION SYSTEM

[75] Inventors: Takehiro Takahashi; Kazuhiko Daito, both of Ibaraki; Akihiro Kawaoka, Kanagawa, all of Japan

[73] Assignees: Hitachi Maxell, Ltd., Osaka; Hitachi, Ltd., Tokyo, both of Japan

[21] Appl. No.: 290,308

[22] Filed: Aug. 12, 1994

Related U.S. Application Data

[63] Continuation of Ser. No. 689,908, filed as PCT/JP90/01323, Oct. 12, 1990, abandoned.

[30] Foreign Application Priority Data

Oct. 13, 1989 [JP] Japan .................................. 1-265225

[51] Int. Cl.$^6$ .................................................. G06F 17/40
[52] U.S. Cl. ........................ 395/800; 364/946; 364/919.4; 364/920; 364/222.3
[58] Field of Search ................................ 395/800; 371/34

[56] References Cited

U.S. PATENT DOCUMENTS

| | | | |
|---|---|---|---|
| 3,805,234 | 4/1974 | Masters | 371/34 |
| 3,995,258 | 11/1976 | Barlow | 371/34 |
| 4,090,247 | 5/1978 | Martin | 364/DIG. II |
| 4,368,519 | 1/1983 | Kennedy | 364/DIG. II |
| 4,446,462 | 5/1984 | Onellette | 340/825.07 |
| 4,503,288 | 3/1985 | Kessler | 192/2 D |
| 4,759,052 | 7/1988 | Hashimoto | 379/67 |
| 4,905,186 | 2/1990 | Fukui | 364/DIG. II |
| 4,953,113 | 8/1990 | Chadima | 364/708 |

FOREIGN PATENT DOCUMENTS

2139457  11/1984  United Kingdom .

*Primary Examiner*—David Y. Eng

[57] ABSTRACT

A data collection system performs data transmission from a portable information collection-transmission unit 1 to a central data reception unit 7 over a telephone line 6. The information collection-transmission unit 1 has a terminal 2 which temporarily stores data and a unidirectional acoustic coupler 3 which converts the data held in said terminal 2 into binary codes of frequencies used for the transmission on the telephone line, and it sends the data over the telephone line 6. The data reception unit 7 has a modem 8 which converts the data signal on the telephone line into a usable digital data signal and a work station 9 which stores the output of the modem, and it is further provided with a voice synthesizer 10 which outputs a prescribed low-frequency audible signal to the telephone line 6 in response to the instruction from the work station 9. After a call from the data collection-transmission unit 1 has been established, the voice synthesizer responds to the instruction from the work station 9 and issues a low-frequency audible signal for the acknowledgement of call establishment to the data collection-transmission unit 1 so that data transmission is commenced.

6 Claims, 7 Drawing Sheets

DATA COLLECTION-TRANSMISSION APPARATUS AND DATA COLLECTION SYSTEM

This application is a continuation of application Ser. No. 07/689,908 filed as PCT/JP90/01323, Oct. 12, 1990, now abandoned.

TECHNICAL FIELD

This invention relates to a data collection-transmission apparatus and data collection system capable of collecting a great deal of data such as sales data.

BACKGROUND ART

In recent years, the volume of data is increasing continuously and handling of data takes a great effort. On this account, computer-based work stations are introduced actively so that a mass of data is stored, arranged and so on without the need of manpower.

For example, in a sales activity of a business firm, a salesman returns to his firm with orders acquired from customers, and the order data are entered to the work station. The work station implements such processes as arrangement and computation for each order data which has been entered and operates to produce order slips and statistic materials.

Collection of order data by a salesman has taken place conventionally in such a way that in response to an order reception, the salesman writes the customer's name, the destination of ordered commodity, the commodity name, the quantity of commodity, etc. in a notebook or a certain form. Portable terminal units (handy terminals) incorporating a CPU (Central Processing Unit), memory, display panel and data input means are available in the market, and the use of such a terminal enables the collection of enormous order data without the risk of input error.

However, the above-mentioned conventional systems need to hold order data which have been collected externally by a salesman until the data are entered to the work station of the firm. In the case of writing order data in a notebook or certain form, the salesman is anxious lest he might lose the written record, or in the case of using a portable terminal unit, the memory capacity is another question and in dealing with a great many order receptions, care must be taken to the memory capacity against overflow.

Furthermore, in the case of entering order data written in a notebook or certain form into the work station, it is normally carried out manually, and with the increase in the number of orders received by each salesman the quantity of order data to be entered to the work station becomes enormous, imposing the need of a considerable labor for the input task and also the possibility of input error.

Moreover, the delivery operation will take place only after the salesman has returned from the customer to his firm and order data written in a notebook or certain form or order data collected in a portable terminal unit has been entered to the work station, resulting in a late delivery to the customer.

In order to overcome these problems, there has been proposed in the past the use of the telephone line for transmitting data stored in a portable terminal unit to the central work station. However, it still suffers the bulkiness of the whole equipment, particularly due to a large acoustic coupler used for connecting the terminal unit to the telephone line.

This invention is intended to overcome the foregoing prior art deficiencies, and its object is to provide a data collection-transmission apparatus which is reduced in size and weight and a data collection system capable of transmitting data collected on the part of a terminal unit to the central work station or the like over the telephone line.

SUMMARY OF INVENTION

In order to achieve the above objective, the data collection-transmission apparatus based on this invention comprises a CPU, an operation means for data input and the like, a memory for storing data entered through the operation means, a signal processing circuit which operates in response to the read command from the operation means to converts data read out of the memory into a binary signal which can be transmitted over a telephone line, and a unidirectional acoustic coupler having a speaker which is supplied with the output signal of the signal processing circuit.

The data collection system based on this invention comprises a portable terminal unit which stores data entered through an operation means and is responsive to read out the data from the memory and produce a binary-converted audible signal which can be transmitted over the telephone line, and a data reception unit which is connected to the telephone line and operates in response to a call to its prescribed telephone number to receive data in the form of a binary-converted audible signal sent over the telephone line and store the data in a work station.

In the data collection-transmission apparatus of this invention, when data is entered by the user's operation through the operation means, it is stored in the memory. In case the user intends to send the data to the work station or the like, the user takes a data fetching operation on the operation means, and the data is read out of the memory, converted into a binary signal which can be transmitted over the telephone line, and then supplied to the speaker. Consequently, the speaker produces a binary-converted audible signal based on the data. In this case, it is necessary for the data reception unit to reply, to the user over the telephone line, that the telephone line has been connected and that it has received transmitted data, and these replies from the data reception unit are made in a high-tone voice or the like through the earphone of the telephone set so that the user confirms the validity of data transmission by hearing the voiced message. Accordingly, by placing a speaker close to the microphone of the telephone set in communication, data is then transmitted over the telephone line.

The operation up to this point is identical to that of the sending part of the conventional handy terminal and acoustic coupler, as mentioned previously.

In the data collection system of this invention, the user operates on a conventional telephone set which communicates with the data reception unit when he places the terminal unit close to the microphone of the sending telephone set, the data stored in the terminal unit is converted into a binary-converted audible signal and transmitted from the telephone set to the data reception unit over the telephone line.

The data reception unit has a modem linked to the telephone line, and when a telephone exchange is connected to the telephone line in response to the generation of a dial tone signal or dial pulse signal indicative of its telephone number, the data reception unit becomes operative to establish audio communication with the user's calling telephone set which has sent the dial tone signal or dial pulse signal and at the same time the work station in connection with the modem is activated, and the data sent from the terminal unit through the telephone set and telephone line is stored in the work station or the like.

In this manner, data stored in the terminal unit can be transmitted to the work station or the like promptly without error. In this case, a unidirectional acoustic coupler is used as the acoustic coupler for data transmission, and therefore the apparatus can be made compact and light weight for use a as portable equipment with outstanding portability.

BEST MODE FOR CARRYING OUT THE INVENTION

The following describes embodiment of this invention with reference to the drawings.

Figure 1:
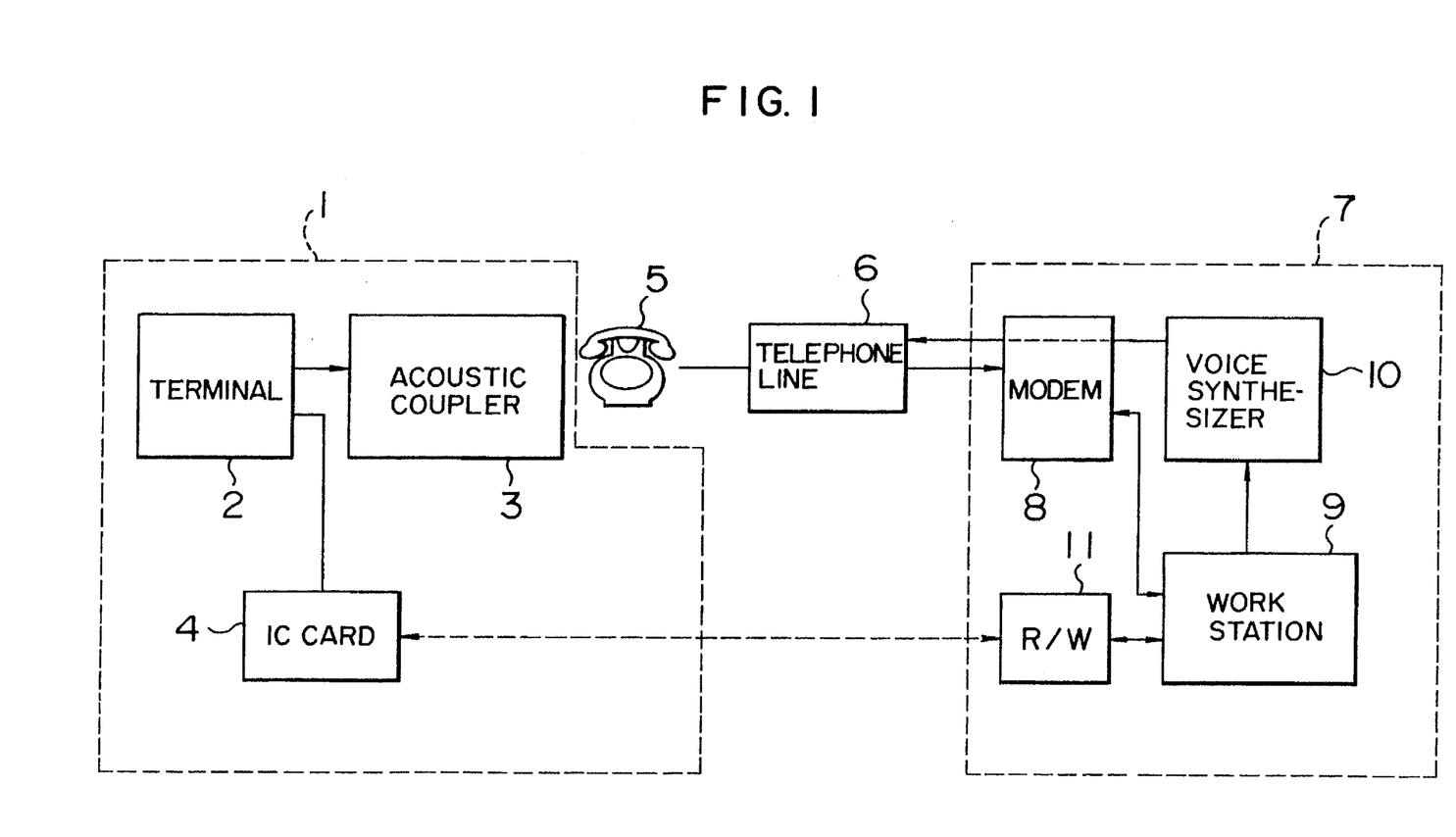
FIG. 1 is a block diagram showing an embodiment of the data collection system based on this invention.

FIG. 1 is block diagram showing an embodiment of the data collection system based on this invention, in which indicated by 1 is a data collection-transmission unit, 2 is an IC card terminal, 3 is an acoustic coupler, 4 is an IC card, 5 is a telephone set, 6 is a telephone line, 7 is a data reception unit, 8 is a modem (modulator/demodulator), 9 is a work station, 10 is a voice synthesizer, and 11 is a reader/writer.

In the figure, the data collection-transmission unit 1 is made up of the IC card terminal 2, the acoustic coupler 3 and IC card 4. The terminal 2 and acoustic coupler 3 may be an integrated unit, or may be formed in units which can be coupled or separated. The terminal 2 also serves as a reader/writer for the IC card 4.

On the terminal 2, data is entered through the input operation by the user and it is stored in the internal memory which is not shown. In the case of sending the data to the base station, the data is read out of the memory and fed to the acoustic coupler 3, and after being modulated into an FSK (Frequency Shift Keying) signal, it is formed into an acoustic signal which can be transmitted over the telephone line 6. The acoustic coupler 3 has a function of only unidirectional conversion from data to FSK signal.

The data reception unit 7 is made up of a modem 8 linked to the telephone line 6, a work station 9, a voice synthesizer 10, and a reader/writer 11 for the IC card 4.

The modem 8 is connected to the telephone line 6, and it operates to demodulate the call signal and FSK signal sent over the telephone line 6 and also receive on its audio input terminal the audio signal produced by the voice synthesizer 10 and send it back over the telephone line 6. When the call signal is sent from the telephone exchange (not shown) over the telephone line 6, the modem 8 detects it and sends a command to the work station 9. In response to this command, the work station 9 is set to the data reception mode. The voice synthesizer 10 is controlled by the work station 9 to issue an audio message signal to the user indicative of the admission of data transmission. This audio signal is placed on the telephone line 6 through the modem 8. Consequently, the user recognizes the status of data transmission admission through the earphone of the telephone set 5 and can proceed to the transmission of subsequent data by operating the terminal 2, and communication with the data reception unit 7 is now established to have data transmission.

In this communication mode, the sound of data produced by the acoustic coupler 3 is sensed by the telephone set 5, and the data is transmitted as an FSK signal to the data reception unit 7 over the telephone line 6. In the data reception unit 7, the FSK signal is demodulated by the modem 8 and stored in the work station 9.

Figure 8:
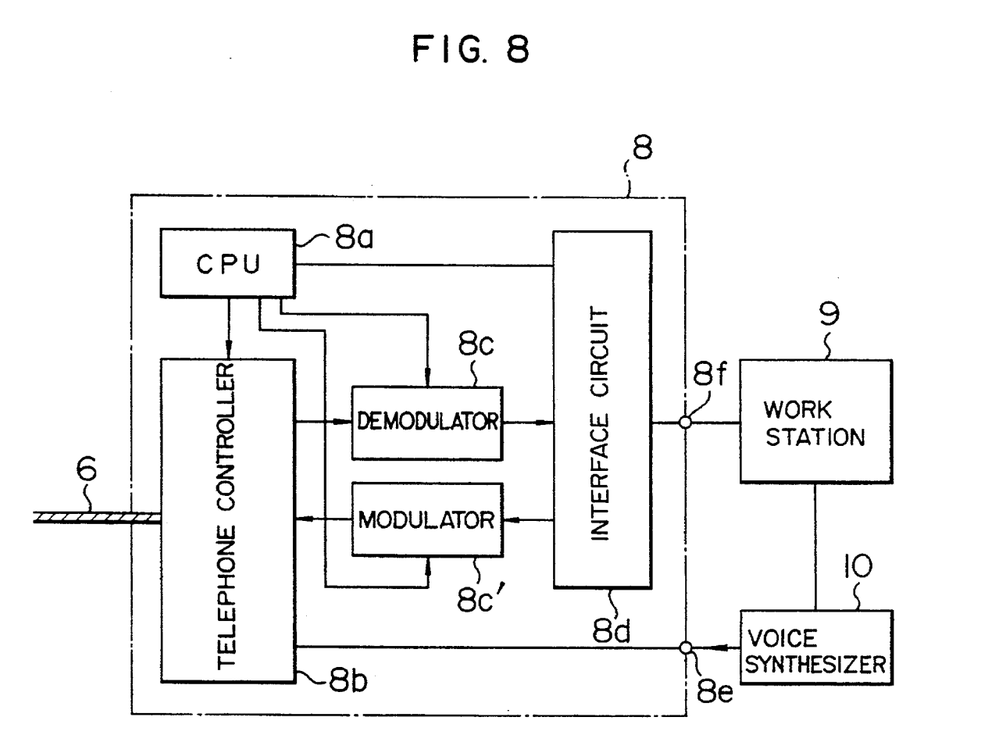
FIGS. 8 and 9 are block diagrams showing specific embodiments of the modem in FIG. 1.
Figure 9:
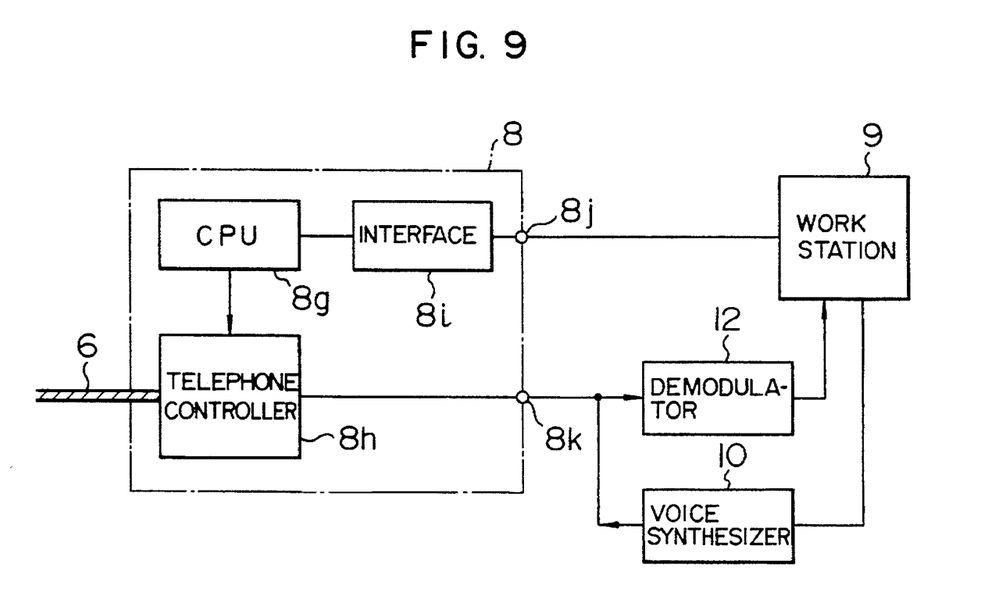

Although the voice synthesizer 10 equipped in the data reception unit is linked to the telephone line 6 through the modem 8, it is not connected to the telephone line 6 after the modulation by the modulation function in the modulation/demodulation function of the modem 8, but a low-frequency audio signal from the voice synthesizer 10 is connected directly through telephone controllers 8a and 8b which function as the interface with the telephone line 6, as will be clarified by the later explanation on FIGS. 8 and 9.

Accordingly, it is also possible to configure the unit which incorporates a specialized interface, instead of using the modem 8.

In the data collection-transmission unit 1, stored data can be transferred to the IC card 4 which is inserted in it, allowing backup of data, and stored in the IC card 4 to be moved to the work station 9 by inserting the IC card 4 in the reader/writer 11 of the data reception unit 7.

Accordingly, data entered in the data collection-transmission unit 1 can be transferred to the work station 9 promptly even from a place distant from the data reception unit 7.

Figure 2A:
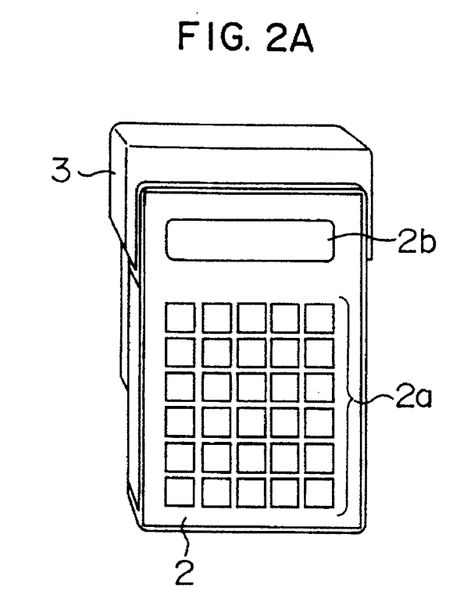
FIGS. 2A and 2B are a front and rear views of the data collection-transmission unit used in the system shown in FIG. 1.
Figure 2B:
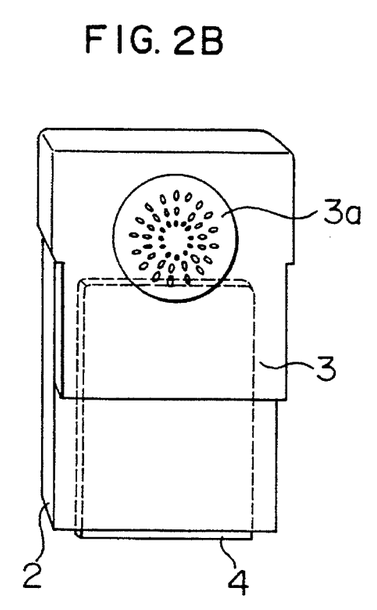

FIGS. 2A and 2B show external views of an embodiment of the data collection-transmission unit 1, with the IC card 4 being set on it. FIG. 2A is a front view and FIG. 2B is a rear view.

As shown in FIGS. 2A and 2B, when the terminal 2 is attached to the acoustic coupler 3, these devices are connected electrically with each other through a connector which is not shown.

Figure 3:
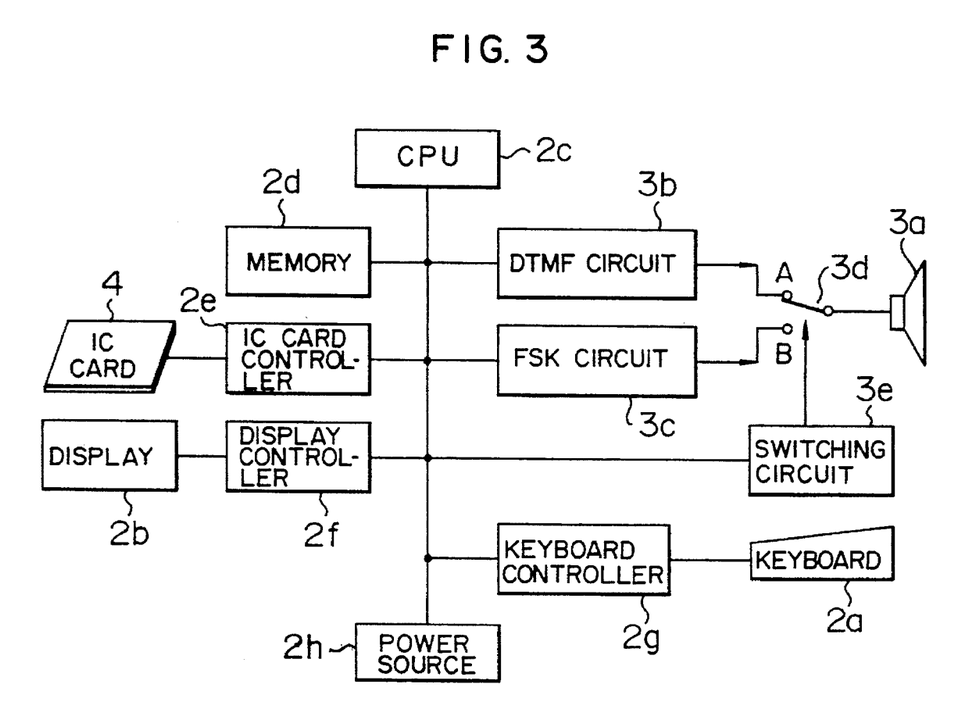
FIG. 3 is a block diagram of the data collection-transmission unit shown in FIGS. 2A and 2B.

FIG. 3 shows a specific embodiment of the circuit arrangement of the data collection-transmission unit 1, with the terminal 2 being attached to the acoustic coupler 3 or these devices being integrated as a unitary unit. In the figure, indicated by 2c is a CPU, 2d is a memory, 2e is an IC card controller, 2f is a display controller, 2g is a keyboard controller, 2h is a power source, 3b is a DTMF (Dual Tone Multi-Frequency) circuit, 2 is a FSK (Frequency Shift Keying) circuit, and 3d is a switch, with blocks identical to those of the figures which have been referenced being given the common symbols. The sections with symbols headed by "2" are equipped in the terminal 2, while the sections with symbols headed by "3" are equipped in the acoustic coupler 3.

Next, the operation of the data collection-transmission unit 1 will be explained with reference to FIGS. 2A, 2B and 3 and the flowchart of FIG. 4, on assumption that the apparatus is used for the sales activity. In this case, the data collection-transmission unit 1 is carried by a salesman, and order data is entered at each order reception from a customer. The order data consists of the costomer's name data, destination data, commodity name data, and quantity data, as shown in FIG. 5.

Initially, the power switch (not shown) of the terminal 2 is turned on so that the voltage from the power source 2h is applied to the circuit, and a menu is read out of the memory 2d and displayed on the display panel 2b thereby to prompt the user to select per step 401 one of "registration of personal code or confidential number", "data input", or "data transmission".

Assuming that the user has selected "registration" by operating the registration key on the keyboard 2a, it is sensed by the CPU 2c through the keyboard controller 2g and the terminal proceeds to the operation of registration process. In this operation, at first, a display on the display panel 2b prompts the entry of the personal code (e.g., company's membership code) of the user who uses this data collection-transmission unit 1. When the user operates the keyboard 2a to enter one's code, it is stored in the prescribed area of the memory 2d for registration (step 402). Subsequently, registration of a person-specific confidential number is prompted, and when the user operates the keyboard 2a to enter the confidential number which is a combination of arbitrary numerals, it is stored in the prescribed area of the memory 2d for registration (step 403).

Once a personal code and confidential number have been registered, they are held until another registration operation is carried out. Accordingly, so far as the same user uses the unit and unless the user needs to change the personal code or confidential number, recursive registration operation is not required.

Once a confidential number has been registered, recursive registration of confidential number is allowed only if an input confidential number matches with the registered confidential number. In case the user forgets the registered confidential number, the user cannot register a confidential number unless the memory of the data collection-transmission unit is cleared and the processing program is loaded.

In case the IC card 4 possessed by a person is usable, the confidential number stored in the IC card 4 is effective, and the confidential number registration process of step 403 is skipped.

After the foregoing registration for the data collection-transmission unit 1 has been completed and when the salesman intends to enter order data received from a customer, he invokes the menu on the display panel 2b and operates the data entry key on the keyboard 2a to select "data input" (step 401). The display controller 2f displays the input prompt for each order data on the display panel 2b in response to the command from the CPU 2c. Then, the user operates the keyboard 2a to enter data indicative of the costomer's name and destination of the received order (step 404), and subsequently enters the commodity name and quantity of the received order (step 405). The input operation is repeated for all commodities of received order until the completion of entry is instructed by the user (step 406). The input data are stored in the data storage area of the memory 2d.

During the data entry by the user, data which is being entered is displayed on the display panel 2b so that the user can check whether or not the data is entered correctly, and the input data is stored in the memory 2d in response to the operation on the keyboard 2a by the user following the check. It is also possible to read out stored data from the memory 2d to the display panel 2b for the confirmation or correction.

In case order data in the memory 2d is to be sent to the data reception unit 7, the user operates the data transmission key on the keyboard 2a to select "data transmission" in the menu displayed on the display panel 2b (step 401). Subsequently, the user operates the keyboard 2a to read out data in the memory 2d to the display panel 2b sequentially thereby to specify data to be sent (step 407). This selection can be implemented by setting a flag for date which is to be sent or data which must not be sent. This selection may otherwise be carried out at data entry.

Next, the user operates the keyboard 2a to enter the confidential number (step 408), and it is collated with the registered confidential number set in step 403 or the registered confidential number on the IC card 4 (step 409). If both numbers do not match, the user is prompted to retry the entry of confidential number, and if the coincident result is not reached within the prescribed number of retrials, such a process as invalidation of the registered confidential number takes place and the control sequence returns to step 401.

In the data collection-transmission unit 1 which accepts the IC card 4, the collation of confidential number in step 409 is implemented inside the IC card 4 and the result of collation is sent to the CPU 2c by way of the IC card controller 2e.

Figure 6:
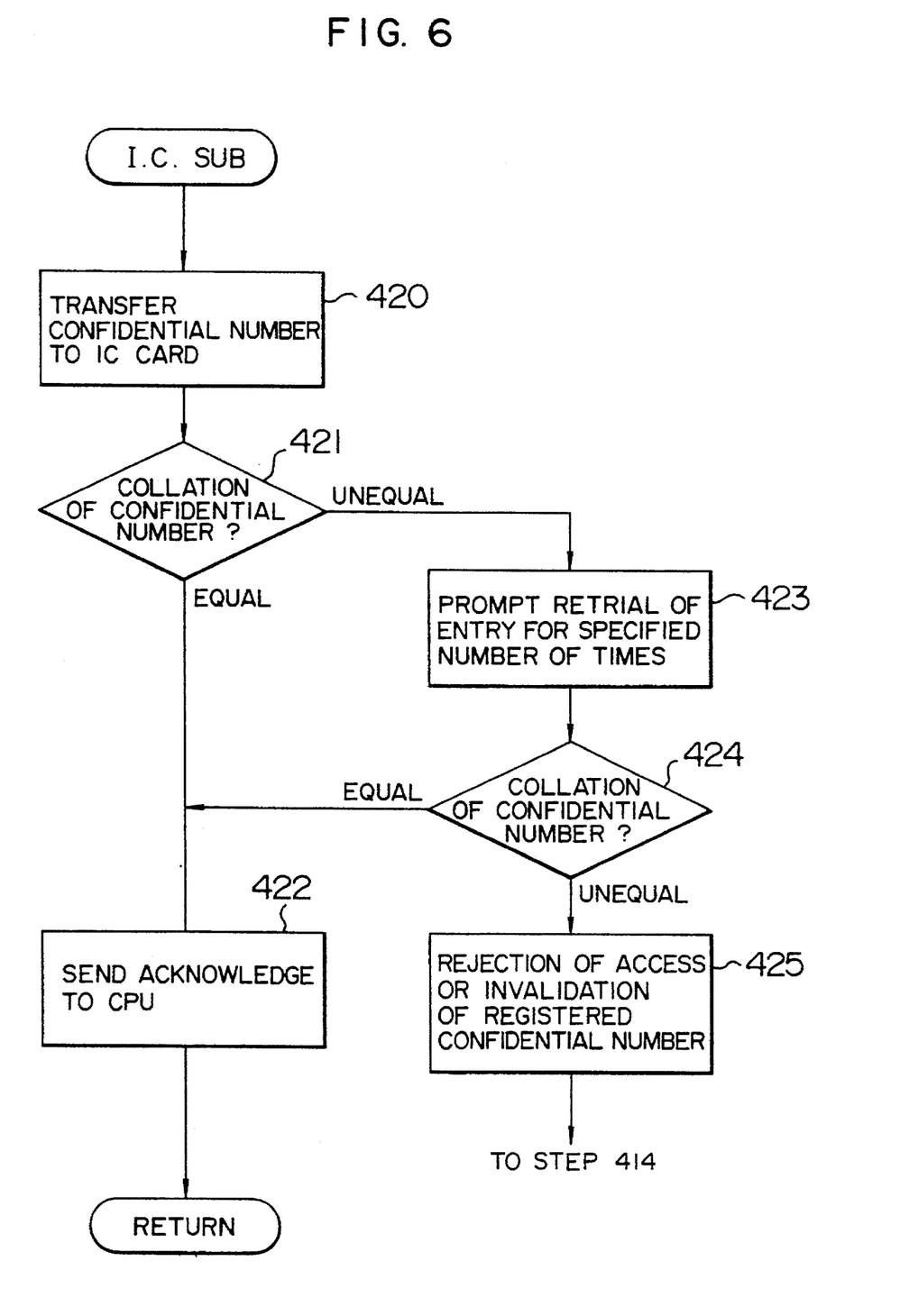
FIG. 6 is a flowchart showing the subroutine of confidential number verification in the flowchart of the operation of the data collection-transmission unit shown in FIG. 4.

FIG. 6 shows the subroutine invoked for this process. In response to the entry of a confidential number to the data collection-transmission unit 1 which is operative with the IC card 4 (step 408), the subroutine shown in FIG. 6 is initiated to transfer the confidential number from the CPU 2c to the IC card 4 by way of the IC card controller 2e (step 420).

Collation of confidential number takes place (step 421), and at the incident of coincidence, an acknowledge signal is sent to the CPU 2c.

If, on the other hand, the collation step 421 has revealed the inconsistency, the display controller 2f displays the prompt of retrial within the prescribed number of times on the display panel 2b by way of the CPU 2c (step 423), and the confidential number is collated again (step 424). When a matching result is reached in this step, the control sequence returns to step 422, or in the event of inconsistency, the data collection-transmission unit 1 operates to reject a further access or invalidate the confidential number registered in the IC card 4 in order to protect data stored in the IC card 4 (step 425).

At the incident of matching between the input confidential number and registered confidential number, a message "auto-dial needed?" is displayed on the display panel 2b. The user examines whether the telephone set used for data transmission has the ability of auto-dial (generally, a telephone set with a rotary dial is not operative in auto-dial mode, and a telephone set with a push-button dial is operative in auto-dial mode), and in the case of a telephone set without the auto-dial function, the user turns the dial of the telephone set to call the data reception unit 7. In the case of a telephone set with the auto-dial function, the user operates the auto-dial key on the keyboard 2a, and the CPU 2c responds to it to operate the DTMF circuit 3b and control the switch circuit 3e to close the switch 3d on the A side.

Consequently, the DTMF circuit 3b generates a dial tone signal, which is identical to that generated by the telephone set, indicative of the telephone number of the data reception unit 7. The dial tone signal is supplied to the speaker 3a by way of the switch 3d, and an audible acoustic signal is produced accordingly. At this time, the speaker 3a is placed close to the microphone of the off-hooked telephone handset. Consequently, the acoustic signal is sensed by the telephone set 5, which then produces the same dial tone signal as the one produced by the manual dialing operation thereby to call the data reception unit 7 (step 411).

Next, when the user confirms the voiced answer-back, which is produced by the voice synthesizer 10 in the data reception unit 7, from the earphone of the telephone set, communication with the data reception unit 7 is enabled. In response to the operation of the data transmission start key on the keyboard 2a by the user, the CPU 2c operates on the switch circuit 3e to reverse the switch 3d to the B side and reads the order data, which have been selected in step 407, sequentially from the memory 2d.

The order data is a binary digital signal formed of "1" bits and "0" bits, and it is fed to the FSK circuit 3c to produce a modulated signal (FSK signal) having a carrier frequency of $f_1$ for "1" bits or a carrier frequency of $f_2$ for "0" bits. The frequencies $f_1$ and $f_2$ are within the transmission band of the telephone line 6. The FSK signal is applied to the speaker 3a by way of the switch 3d, and the speaker 3a produces a sound having the frequencies of the FSK signal.

The speaker 3a is kept close to the microphone of the off-hooked handset of the telephone set 5, and the sound produced by the speaker 3a is introduced to the telephone set 5 and the order data carried by the FSK signal is transmitted over the telephone line 6 (step 412).

After the confirmation of the voiced answer-back by the user, if the transmission of order data is not normal (step 413), data transmission will be restart (step 412).

At the data transmission, the personal code registered in the memory 2d is also sent, so that the person pertinent to the order data is made known.

These series of processes can be started from any of registration, data input and data transmission selected on the menu in step 401, and on completion of process for the selected sequence. control can proceed to the next operation continuously based on the decision of step 414.

It is also possible to record data stored in the memory 2d into the IC card 4, or to store data recorded in the IC card 4 into the memory 2d. Accordingly, the IC card 4 functions as a backup means for the memory 2d. Needless to say, the collation of confidential number is implemented with respect to the IC card 4 in this case.

Since the confidential number is collated with the IC card 4 as mentioned above at data transmission (steps 408,409), data transmission by other person can be inhibited and illegal data transmission can be prevented. By executing the confidential number collating function with the IC card 4, which has been illustrated as a subroutine in FIG. 6, before each of steps 402,404 and 407, it is possible to disallow the use of the data collection-transmission unit 1 by other person, whereby the prevention of illegal use of the data collection-transmission unit 1 and the protection of secrecy of data are ensured.

Figure 7:
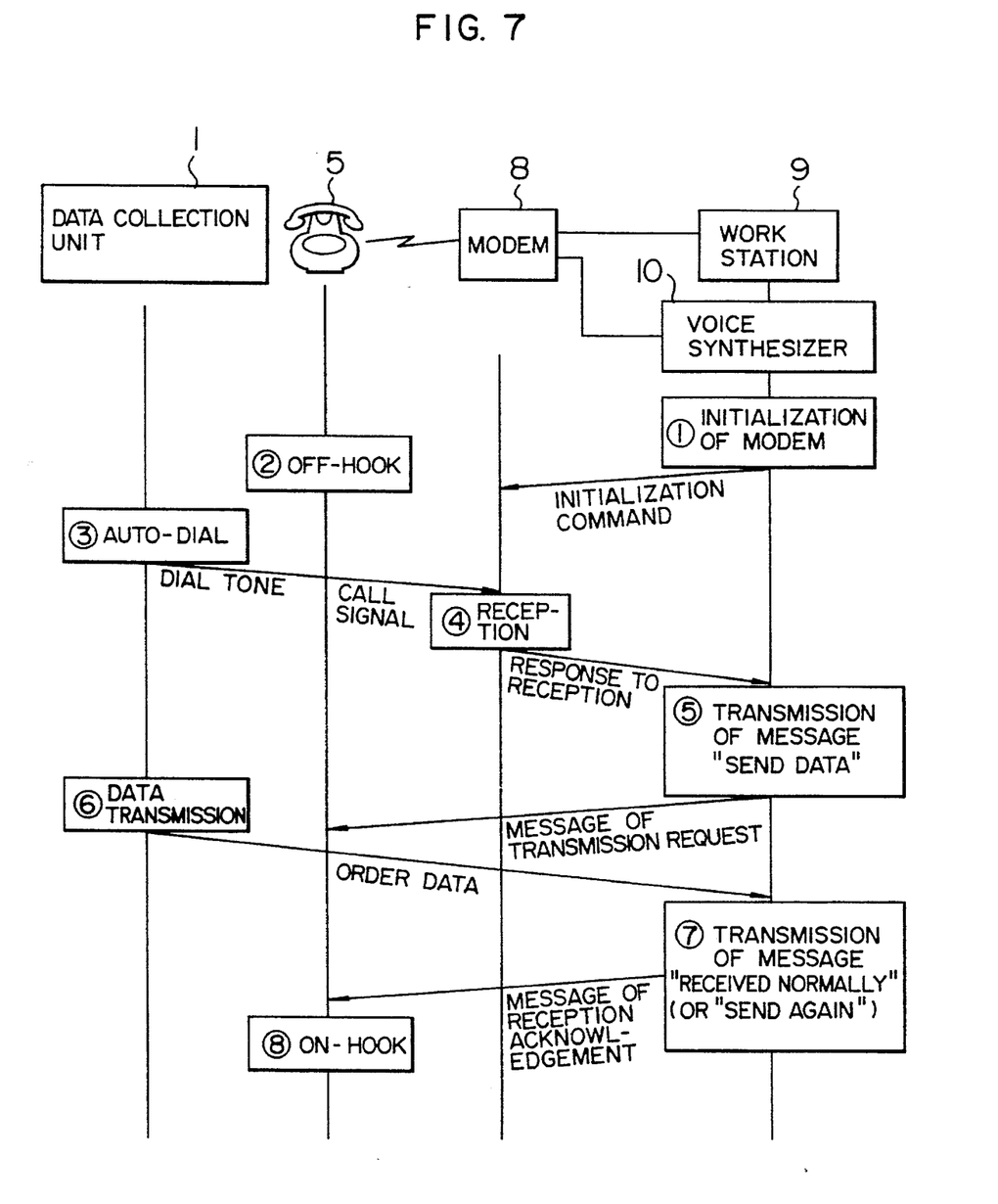
FIG. 7 is a diagram showing the data transmission procedure of the overall system shown in FIG. 1.

Next, the data transmission operation of the data collection system shown in FIG. 1 will be explained with reference to FIG. 7. FIG. 7 has time axes in the vertical direction, on which are shown separately the operations of the data collection-transmission unit 1, telephone set 5, modem 8, work station 9 and voice synthesizer 10, with the order of operations being indicated by numerals enclosed by circles.

In FIG. 7, the modem 8 has already been initialized by the initializing command from the work station 9.

In the case of sending out data from the data collection-transmission unit 1, the telephone set 5 is off-hooked at the beginning, and auto-dialing (this is the operation of step 411 in FIG. 4) is carried out thereby to call the data reception unit 7. If the telephone set 5 is of the type without the auto-dial function, the user dials the telephone set 5 manually. Consequently, the modem 8 receives a call signal (reception), and it sends a reception acknowledge signal to the work station 9.

The work station 9 responds to this signal to enter the data reception mode, and operates on the voice synthesizer 10 to generate an audio signal of a message, e.g., "Send data". This audio signal is fed through the modem 8 and transmitted to the telephone set 5 over the telephone line 6.

Figure 4:
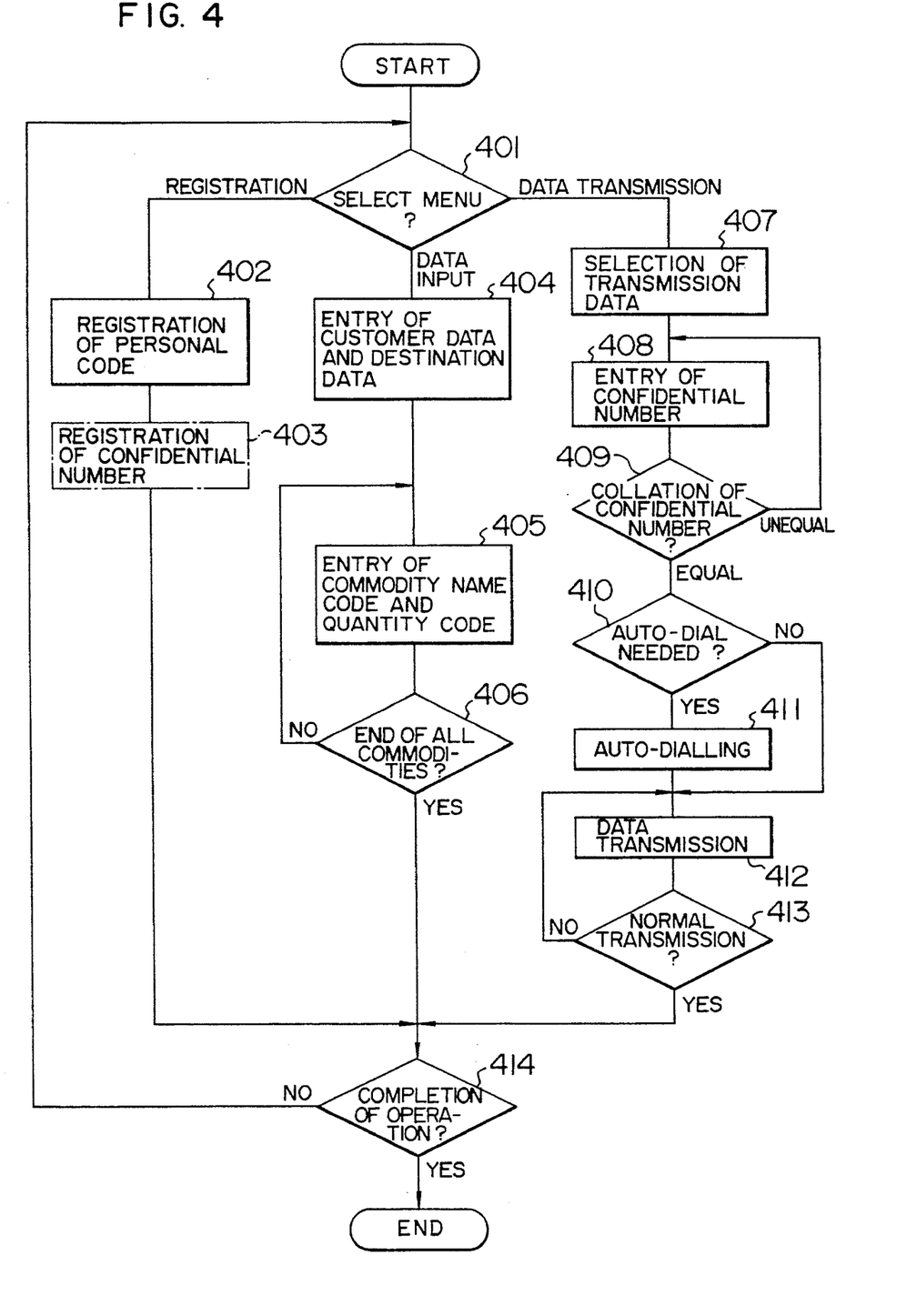
FIG. 4 is a flowchart showing the operation of the data collection-transmission unit shown in FIG. 3.
Figure 5:
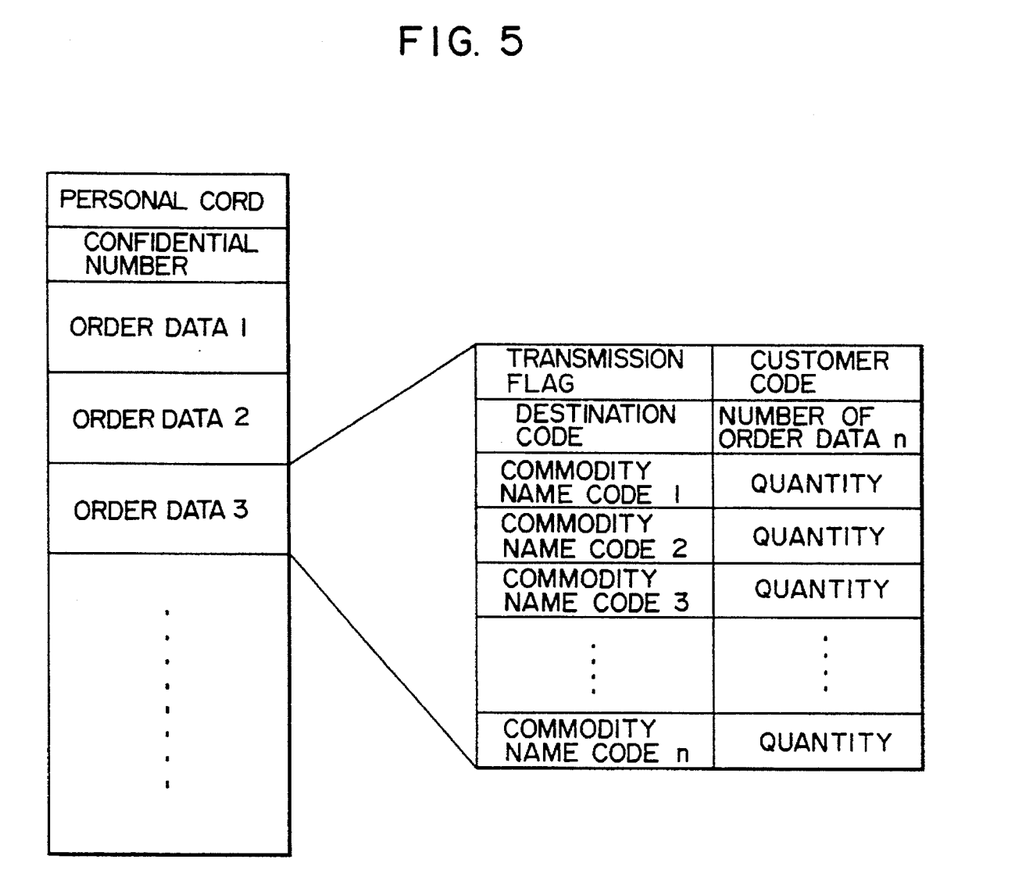
FIG. 5 is a diagram showing as an example the format of data stored in the IC card.

The user hears the message on the telephone set 5, and transmits order data in the data collection-transmission unit 1 by using the telephone set 5 over the telephone line 6, as explained for step 412 in FIG. 4. The order data is processed by the modem 8 and thereafter introduced to the work station 9.

On receiving the entire order data correctly, the work station 9 operates on the voice synthesizer 10 to generate an audio signal of a message, e.g., "Received normally", or if it could not introduce order data correctly, it lets the voice synthesizer 10 generate an audio signal of a message, e.g., "Send again". On receiving the latter message on the telephone set 5, the user takes a recursive order data transmission, or on receiving the former message, the user on-hooks the telephone set 5 to complete the operation.

Once the work station 9 has introduced order data, it can commence the delivery operation for the order immediately, and in consequence delivery of commodity to the customer can be sped up.

For the modem 8 in FIG. 1, a commercially available model with the setup of the specified carrier frequencies $f_1$ and $f_2$ of FSK signal can be used.

FIG. 8 shows in brief, as an example, the modem VM-12 having an audio input/output terminal manufactured by Sharp Corp.

In the figure, a telephone controller 8b is linked directly to the telephone line 6, and it has the reception wait mode, line connection (off-hook) mode and line disconnection (on-hook) mode switched by the control of a CPU 8a. The modem is provided with a digital signal input/output terminal 8f connected to an interface circuit 8d, and an audio signal input/output terminal 8e connected to the telephone controller 8b. The CPU 8a activates a demodulation circuit 8c or modulation circuit 8c' depending on the command received on the digital signal input/output terminal 8f. The demodulation circuit 8c demodulates the FSK signal, while the modulation circuit 8c' modulates the input digital signal into the FSK signal.

In case the above modem is used for the modem 8 in FIG. 1, the work station 9 is connected to the input/output terminal 8f and the voice synthesizer 10 is connected to the audio input/output terminal 8e. The modulation circuit 8c' is not used. The dial tone signal has its carrier frequencies set to 1080 Hz and 1750 Hz in compliance with the CCITT V21 standard in this case. Accordingly, the foregoing carrier frequencies $f_1$ and $f_2$ for the modulation of data by the FSK circuit 3c (FIG. 3) are also set to these frequencies.

In the standby state, the CPU 8a sets the reception wait mode for the telephone controller 8b in accordance with the modem control signal received from the work station 9 through the interface. When the dial tone signal is transmitted by the telephone set 5 (FIG. 1) and a call signal comes in by way of the telephone exchange, the CPU 8a brings the telephone controller 8b to the line connection mode and sends a reception response to the work station 9. The work station 9 operates on the voice synthesizer 10 to generate the above-mentioned audio message signal. This audio signal is fed to the modem 8 through the audio input/output terminal 8e, and sent over the telephone line 6 through the telephone controller 8b.

In case order data is transmitted from the data collection-transmission unit 1 (FIG. 1), the order data in the form of the FSK signal is sent to the demodulation circuit 8c through the telephone controller 8b and, after being demodulated by it, sent to the work station 9. When the work station 9 operates on the voice synthesizer 10 to generate the audio message signal for the response to the normal reception or the request of recursive transmission, the signal is fed to the modem 8 through the audio input/output terminal 8e and it is sent over the telephone line 6 through the telephone controller 8b. The telephone set 5 (FIG. 1) is on-hooked, and in response to an incoming busy-tone signal from the telephone exchange, the CPU 8a brings the telephone controller 8b to the line disconnection mode.

FIG. 9 shows in brief, as another example of the modem 8 in FIG. 1, the NCU (Network Control Unit), model PNC-3400, manufactured by I/O Data Equipment.

In the figure, a telephone controller 8h is linked directly to the telephone line 6, and it has the reception wait mode, line connection mode and line disconnection mode switched by the control of a CPU 8g. The CPU 8g is connected to the command input/output terminal 8j through an interface circuit 8i, and the NCU is further provided with an audio input/output terminal 8k connected to the telephone controller 8h.

In case this NCU is used for the modem 8 in FIG. 1, the work station 9 is connected through its control terminal to the input/output terminal 8j and the voice synthesizer 10 is connected to the audio input/output terminal 8k. The FSK signal demodulator circuit 12 has its input terminal connected to the audio input/output terminal 8k and its output terminal connected to the data terminal of the work station 9. The dial tone signal has its carrier frequencies set to 2025 Hz and 2225 Hz in compliance with the BELL 103 standard in this case. Accordingly, the foregoing carrier frequencies $f_1$ and $f_2$ of the FSK signal sent from the data collection-transmission unit 1 (FIG. 1) are also set to these frequencies.

The CPU 8g controls the telephone controller 8h in accordance with the modem control signal which is supplied from the work station 9 through the interface circuit 8e. The FSK signal of data sent over the telephone line 6 is supplied from the telephone controller 8h to the demodulator 12, and the demodulated signal is supplied to the work station 9. The audio message signal produced by the voice synthesizer 10 is placed on the telephone line 6 by way of the audio input/output terminal 8k and telephone controller 8h.

Next, other embodiments of the data collection-transmission apparatus based on this invention will be described as a second embodiment, third embodiment and so on. Since these embodiments are simplified versions of the preceding embodiment, they will be explained by use of the drawings which have been referenced.

The second embodiment is designed such that the memory 2d of the terminal 2 in FIG. 1 can store only order data and the IC card 4 is not used. Accordingly, the IC card controller 2e in FIG. 3 is absent and the personal code registration step 402 in FIG. 4 is absent in this embodiment.

The data input operation and data transmission operation of this embodiment are virtually identical to those of FIG. 4, and in case the personal code needs to be sent prior to data transmission, the user operates the keyboard 2a to enter the personal code to the terminal 2 and it is converted by the acoustic coupler 3 into a sound signal to be introduced to the telephone set 5.

The third embodiment is designed such that the memory 2d of the terminal 2 can store order data and also personal code. The arrangement is identical to the second embodiment, but this embodiment differs from the second embodiment in that if the personal code is registered in the memory 2d, it is sent automatically at data transmission.

The fourth embodiment is designed to use a memory card or optical card as an ID card, with the personal code being recorded on it, with the intention of eliminating the need of personal code registration. In this case, such an ID card is set on the terminal 2, which then reads the personal code to enable the transmission. However, the ID card cannot be used to store order data. Namely, the ID card controller which is equivalent to the IC card controller 2e in FIG. 3 only reads data out of the ID card.

The fifth embodiment is derived from the fourth embodiment, but order data is stored in the ID card instead of the memory 2d of the terminal 2. At data transmission, the personal code and order data are read out of the ID card.

The sixth embodiment uses the IC card, and order data is stored in the memory 2d of the terminal 2. The personal code is recorded in the IC card in advance, and it is read out and sent at transmission. In this case, the collation with the confidential number of the IC card is necessary at reading out the personal code, and other person cannot read out the personal code.

The seventh embodiment is derived from the sixth embodiment, but order data is stored in the IC card instead of the memory 2d. At data transmission, the personal code and order data are read out of the IC card and sent.

In the second through fifth embodiments, it is also possible to store the confidential number in the memory 2d of the terminal 2, thereby preventing an illegal access based on the collation of the confidential number at the use of the terminal 2 or data transmission which has been explained on FIG. 4.

In each of the foregoing embodiments, it is also possible to register personal codes in the work station 9 so that it introduces transmitted order codes only for legal persons through the collation of personal codes sent from the data collection-transmission unit 1. The personal code may have a function of rejecting the entry of illegal data to the work station 9, in addition to the function of distinguishing orders based on person.

Although in the foregoing embodiments, data received by the data reception unit 7 is stored in the work station, it may be stored in other capacious device such as a terminal which is controlled by a large computer. Although in the foregoing embodiments, voiced messages are produced by using a voice synthesizer board, predetermined signals may be produced by means of a buzzer or the like.

Furthermore, although the foregoing embodiments are intended for sales activities, this invention is not confined to this application.

The foregoing embodiments enable the user to collect necessary data accurately and transmit the collected data to the work station over the telephone line by merely carrying the apparatus of outstanding portability, whereby input data can be transferred to the work station promptly, surely and without error even from a place distant from the work station, the anxiety about the loss of data and the labor of data transaction are eliminated, and the memory capacity needed for data collection can be reduced significantly.

INDUSTRIAL APPLICABILITY

As described above, according to the data collection-transmission apparatus and the data collection system using the same based on this invention, it is possible to transmit data recorded in the portable data collection-transmission unit to the central data reception unit directly based on data communication through the acoustic coupler attached to the data collection-transmission unit for converting data in the unidirectional manner into the signal form of telephone line, and they are useful for data collection from remote places through the telephone line.

We claim:

1. A data collection system comprising:
    a portable data collection-transmission unit including;
        memory means for storing data,
        operation means for entering operational instructions including data input/output instructions to said memory means,
        a central processing unit for processing data input and output to/from said memory means in accordance with the operational instructions entered through said operation means,
    a unidirectional acoustic coupler including signal processing circuit means for converting data read out of said memory means by said central processing unit in accordance with operational instructions from said operation means into a data input signal which can be transmitted over a telephone line, and
    a speaker, responsive to said signal from said signal processing circuit means and converting the signal into an acoustic signal and supplying the acoustic signal to a telephone set, and
    a data reception unit including;
        demodulating means connected to said telephone line for converting the acoustic signal transmitted over said telephone line into a data output signal,
        information terminal means for storing said data output signal from said demodulating means to judge the result of the received data, and
        acoustic synthesizing means connected to said telephone line for generating a synthesized response message and coupling said response message to said data collection-transmission unit over the telephone line in response to the result of the received data judged by said information terminal means.

2. A data collection-transmission system according to claim 1 and further comprising;
    a dial tone generation circuit producing a dial tone signal representing a certain telephone number, and switching means for selecting, in accordance with the operational instruction from said operation means, one said dial tone signal produced by said dial tone generation circuit or the data input signal signal produced by said circuit means for converting data and supplying the selected signal to said speaker.

3. A data collection-transmission system according to claim 1 and further comprising:
    a detachable IC card attached to said data collection-transmission unit, said central processing unit enabling data input and output to/from said IC card and data transfer with said memory in accordance with said operational instructions received from said operation means.

4. A data collection system according to claim 1, wherein said memory of said data collection-transmission unit stores an identification code, and said central processing unit outputs data read out of said memory to said unidirectional acoustic coupler only when input information inputted from said operation means coincides with said identification code.

5. A method of operating a data collection system including a portable data collection-transmission unit and data reception unit, comprising the steps of:
    storing data in said portable data collection-transmission unit inputted from means provided with said portable data collection-transmission unit,
    dialing a certain telephone number corresponding to said data reception unit,
    transferring said data from said portable data collection-transmission unit to said data reception unit over a telephone line via a unidirectional coupler,
    receiving said data from said portable data collection-transmission unit,
    judging the received data at an information terminal means in said data reception unit, and
    synthesizing a message in response to a data receiving condition of said received data by a voice synthesizer and outputting the synthesized message to said telephone line.

6. A method according to claim 5 and further comprising the step of:
    inputting and storing an identification code in said portable data collection-transmission unit, and
    collating an instruction data inputted to said portable data collection-transmission unit with said identification code.

* * * * *